US009998409B2

(12) United States Patent
Partovi

(10) Patent No.: US 9,998,409 B2
(45) Date of Patent: Jun. 12, 2018

(54) SYSTEMS AND METHODS FOR COMMUNICATION FACILITATION

(71) Applicant: EMERGE.MD INC., Phoenix, AZ (US)

(72) Inventor: Shahram Partovi, Paradise Valley, AZ (US)

(73) Assignee: AVIZIA, INC., Reston, VA (US)

( * ) Notice: Subject to any disclaimer, the term of this patent is extended or adjusted under 35 U.S.C. 154(b) by 144 days.

(21) Appl. No.: 13/733,413

(22) Filed: Jan. 3, 2013

(65) Prior Publication Data

US 2013/0191475 A1 Jul. 25, 2013

Related U.S. Application Data

(60) Provisional application No. 61/583,127, filed on Jan. 4, 2012.

(51) Int. Cl.
*G06F 15/16* (2006.01)
*H04L 12/58* (2006.01)

(52) U.S. Cl.
CPC ............ *H04L 51/046* (2013.01); *H04L 51/14* (2013.01)

(58) Field of Classification Search
CPC .............................. H04L 51/046; H04L 51/14
USPC ........................................................ 709/206
See application file for complete search history.

(56) References Cited

U.S. PATENT DOCUMENTS

| | | | |
|---|---|---|---|
| 6,798,772 B2 | 9/2004 | Bergman et al. | |
| 6,952,468 B2 | 10/2005 | Lee | |
| 7,280,535 B1 | 10/2007 | Bergman et al. | |
| 7,483,525 B2 | 1/2009 | Chaddha et al. | |
| 7,908,261 B2 | 3/2011 | Getchius | |
| 2005/0018820 A1* | 1/2005 | Chaddha et al. | ........... 379/88.13 |
| 2006/0229934 A1* | 10/2006 | Law | ................................. 705/10 |
| 2009/0280786 A1 | 11/2009 | Ziklik | |
| 2010/0203909 A1 | 8/2010 | Oldach | |
| 2010/0279666 A1* | 11/2010 | Small et al. | ................ 455/414.1 |
| 2010/0286997 A1 | 11/2010 | Srinivasan | |
| 2011/0116616 A1* | 5/2011 | Selph et al. | .............. 379/210.02 |

OTHER PUBLICATIONS

Communication pursuant to Article 94(3) EPC for European Application No. 13733771.3-1870, dated Nov. 9, 2017 (4 page).

* cited by examiner

*Primary Examiner* — Hee Soo Kim
(74) *Attorney, Agent, or Firm* — Finnegan, Henderson, Farabow, Garrett & Dunner LLP

(57) ABSTRACT

The invention relates to systems and methods for communication facilitation. Such communications may include work communications and/or personal communications. Communications may be made without disclosing or requiring knowledge of recipient contact information. Pre-communications disclosures may be provided to a recipient prior to actually connecting a sender with a recipient. Communications may be made in accordance with one or more recipient template, which may include pre-determined contact modes for pre-determined scenarios in accordance with recipient or third party instructions. Peripheral information or sender responses to one or more queries may assist with determining the scenario that a communication falls under.

42 Claims, 9 Drawing Sheets

SYSTEMS AND METHODS FOR COMMUNICATION FACILITATION

CROSS-REFERENCE

This application claims priority to U.S. Provisional Patent Application Ser. No. 61/583,127, filed on Jan. 4, 2012, which is entirely incorporated herein by reference.

BACKGROUND

The paradigm of messaging has not changed since the age of carrier pigeons; namely, a sender constructs a message and tries to find the recipient so as to deliver the message payload. Over centuries the methods of message delivery have improved, but in truth all advances have simply accelerated this exact unilateral messaging model. For example, the horse and carriage message delivery eventually gave way to railways, which in turn gave way to airmail. Eventually, written communication was supplemented by verbal communication with the invention of the telephone, and with the discovery of radio transmitters wired communication became wireless. Still, the fundamental premise that the originator had to find the target remained the same, whether traveling by horse or by radio waves. More recent technological advances such as pagers, cell phones, voice mail, text messaging (SMS), email and instant messaging have pushed the communication latency down to near zero, but still each of these technologies share a common ancestry with the mediaeval horseman: the message sender must have knowledge of where to find the message recipient. Translated into real-life terms, the message originator must have apriori knowledge of the target's "address" [choose: phone number, pager number, SMS number, email address, IM address] or else the sender cannot "deliver" their message to their intended target.

The desire to push message delivery latency towards zero has mandated that potential recipients of messages disclose their addresses, electronic or otherwise, to others. Moreover, by natural extension, the farther and wider individual (electronic) addresses are dispersed, the faster any particular communication payload will reach recipients. When considering the increasing demand for real-time communication in modern society, it would seem conclusive for individuals to distribute their electronic addresses to a global audience to enable rapid, if not instant, real-time communications. Yet, juxtaposed against this desire for real-time communication is the imperative matter of individual privacy. While a wide publication of personal addresses could propel real-time communication and instant message delivery, it would clearly bear a negative impact on personal privacy. Such an action would provide complete strangers indiscriminate, unfettered and immediate access to recipients. Inappropriate individuals and organizations could then flood recipients with irrelevant—if not inappropriate—communications thereby creating an electronic traffic jam in personal communication highways. In simpler terms, the desire for real-time communication quickly leads to a law of diminishing returns whereby the greater the ability for others to reach recipients instantly, the less the recipients' ability to manage and act upon relevant and time sensitive communications.

Attempts to manage these conflicts have been made in our personal (private) lives. Most individuals will err on the side of caution and limit the disclosure of their electronic addresses in favor of privacy. For example, individuals provide their cell phone numbers to selective individuals and avoid unnecessary disclosure of email addresses to avoid spam messages. In their personal lives, individuals are willing to tolerate some delay in communication transactions in favor of privacy. While an "inner circle of friends and family" are empowered with sufficient details for real-time communication, the "rest of the world" finds us at a reduced speed, such as by US postal mail. For example, most individuals would not wish to provide private cell phone numbers to, say grocery store managers, so that they may call them with the latest in-store specials. While the delay in grocery store messaging may "cost" a good bargain, various factors including the desire for privacy naturally deter individuals from revealing methods of real-time messaging to such an organization.

In sum, it may be reasonable to conclude that in their personal lives, individuals can attempt to converge onto a balance between a desire for real-time messaging and a need for privacy. A middle ground may be sought which may be vastly different among individuals.

Achieving this balance is far more elusive in the workplace, especially in industries with a mobile workforce such as healthcare where workflow (aka productivity) is highly dependent upon the arrival of information to the individual. A mobile healthcare workforce has no reliable fixed address such as a desk phone, since they do not remain stationary in any consistent manner. And even at times when healthcare workers are stationary, their "stations" may physically change from one hospital ward to another, or from one patient room to the next. Moreover, while healthcare workers do engage computer terminals, they do so at inconsistent times and for variable durations depending upon the stage of patient care. Hence, healthcare organizations are faced with the following dilemma: a mobile workforce whose productivity—and hence patient care—depends upon information delivery, but whose workers are not consistently and uniformly accessible via any real-time electronic means. To complicate matters further, it is often not practical to permit self-designed strategies for real-time communication at the workplace. Not only would the ensuing confusion be paralyzing, but moreover, some individually designed methods may actually be counter productive leading to a decrease in productivity and raising concerns around patient safety.

The ensuing paradox is that while each employee has a developed set of electronic addresses, which they personally prefer for real-time communication, employers cannot make systematic use of those means. As discussed earlier, personal privacy issues among other factors prevents individuals from voluntarily publishing their personal cell phones addresses simply to enhance workflow productivity. Moreover, disclosing personal electronic addresses for work purposes could also lead to "work spam" wherein messages may come into our personal addresses at inappropriate times while off-work. Worse yet, some of such messages may be of an urgent nature leaving the off-work employee in a troublesome conundrum of how to respond—if at all. There would be little argument from any employee or employer that publishing private worker electronic addresses for workflow optimization would invariably lead to work-life imbalance. For example, asking physicians or nurses to widely publish their personal mobile number in order to improve patient care could lead to a flood of trivial calls, leading to a counter-productive constant interruptions while at work, and a significantly decrease quality of life at home should these numbers reach patients or their families.

In short, it is without question that healthcare organizations have a real and pressing communication dilemma. Their mobile workforce depends on information delivery to remain productive and to deliver quality care, yet real-time communications using an employee's private electronic addresses seems a completely nonviable option. To resolve this conflict, healthcare organizations have resorted to complex and expensive means of enabling communication and collaboration among their employees and partner providers. Sadly, the returns on the investment have been marginal at best.

The most common strategy has been to assign an electronic "work-device" so that during work-hours this electronic address, distinct from private life electronic addresses, can be used for communication and messaging. These work-address initiative have included solutions such as issuing pagers, leveraging expensive nurse triage phone systems, overhead paging of physicians, using answering-service staff, installing back-office phone lines, issuing mobile phones, providing computers on wheels, issuing PDAs, tablets, laptops and so on; the list of endpoint devices and technologies tried by healthcare systems for interpersonal communication is practically endless. Regrettably, none of these technologies have actually been able to deliver on the promise of real-time communication as judged by the ability of a system to enhance productivity through the elimination of wait-states. Even when an endpoint device actually offers the opportunity for a real-time collaboration, such as via a mobile phone or nurse triage phone, the deployment scenarios invariably require the caller to patch through a third party! For example, to reach a nurse on the nurse triage phone systems, one has to first contact the unit clerk who then transfers to the nurse if she is available, or when physicians are issued mobile phones, the caller typically has to request a call back via a pager since the mobile number is still be deemed private despite being employer issued. Overall, the diversity of technologies used has resulted in significant financial strain on organizations already operating at lean margins, while still not delivering on the promise of a real-time enterprise. When considering the capital expense combined with the burden of training, support, maintenance and upgrades, it's simply a marvel that no single solution has emerged to deliver real-time communication for this mobile healthcare workforce—until now.

One problem is that traditional systems operate from the wrong base assumption; one that dates back to the horseback mailman, namely, that it is the duty of the message originator to have apriori knowledge of the target address, or else spend precious time finding the target address in advance of communicating. It is this assumption that has led to the conflict of privacy versus real-time efficiency, and has—almost by accident—caused organizations to adopt futile and expensive technologies to solve the wrong problem. The process of publishing individuals' various electronic addresses not only poses questions surrounding privacy, but also moreover creates a non-scalable situation. In a mobile healthcare workforce, there are innumerable potential addresses for an individual depending on a multitude of workflow factors, most of which is not even known to the message originator. In the absence of this workflow information, the communication originator has little chance of "hitting" the correct target address on first attempt—even if she had all the latest correct addresses (itself a weak assumption at best).

The message originator has to inefficiently iterate though a list of potential addresses (try nursing station, try MD back line, try pager, try cell phone, try overhead paging, etc. . . . ) in the hopes of finding the target. All the meanwhile, work productivity has entered a wait-state, and with it patient care and throughput has been negatively impacted.

Thus, a need exists for improved communication techniques that may meet a need for real-time communications while maintaining privacy. A further need exists for communication facilitation that may assist with enhancing workplace productivity while maintaining work-life balance.

SUMMARY OF THE INVENTION

The invention relates to systems and methods for communication facilitation. Such communications may include work communications and/or personal communications. Communications may be made without disclosing or requiring knowledge of recipient contact information. Pre-communications disclosures may be provided to a recipient prior to actually connecting a sender with a recipient. A sender may send a communication to the recipient in accordance with a recipient (or third party) template that may provide one or more contact modes for various scenarios.

Distinctions between personal and workplace communications may be discussed further. Some may argue that the mission and vision of work-life balance may be to ensure that what happens at work, stays at work. These proponents might claim that any solution which brings private and workplace communication closer together is a step in the wrong direction, and that a "work-device" is best way to protect the worker from work-spam while introducing real-time communications (which sadly it does not). To the contrary, one way to achieve true work-life balance and enhances workplace productivity is to devise a unified solution that optimizes real-time communication both for the individual personally and the workplace collectively.

This union may encourage end-user adoption since this solution could deliver recognizable personal value beyond accelerating workplace efficiency. It is the former, not the latter, that is critical to achieving viral propagation of an innovative tool within an enterprise with the latter becoming an almost incidental benefit to the enterprise.

A solution being presented by the inventions described herein may be a cloud-based or locally hosted software service that can 1) maintain end-user privacy, 2) deliver on the promise of real-time workplace communication and collaboration, 3) reduce or potentially eliminate the need for expensive and ineffective employer supplied end-devices, and/or 4) deliver both corporate and personal value so as to drive viral end-user adoption.

Finally, no discussion of communication and collaboration in a healthcare enterprise can be deemed complete without reference to those that are cared for: namely the patients, their families and other loved ones. It is no surprise that the broken model of carrier pigeon messaging extends beyond inter-provider communication. Nurses and physicians spend ineffective time trying to find family members, and likewise, families spend futile frustrating hours trying to connect with appropriate providers. The scalable nature of this solution becomes plainly apparent when the model is seamlessly, securely and private extended to patients and their families. Hence, a fifth value proposition can be added to the four above: 5) be open to patients, families and other members of the healthcare ecosystem to enhance real-time communication across the continuum of care.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
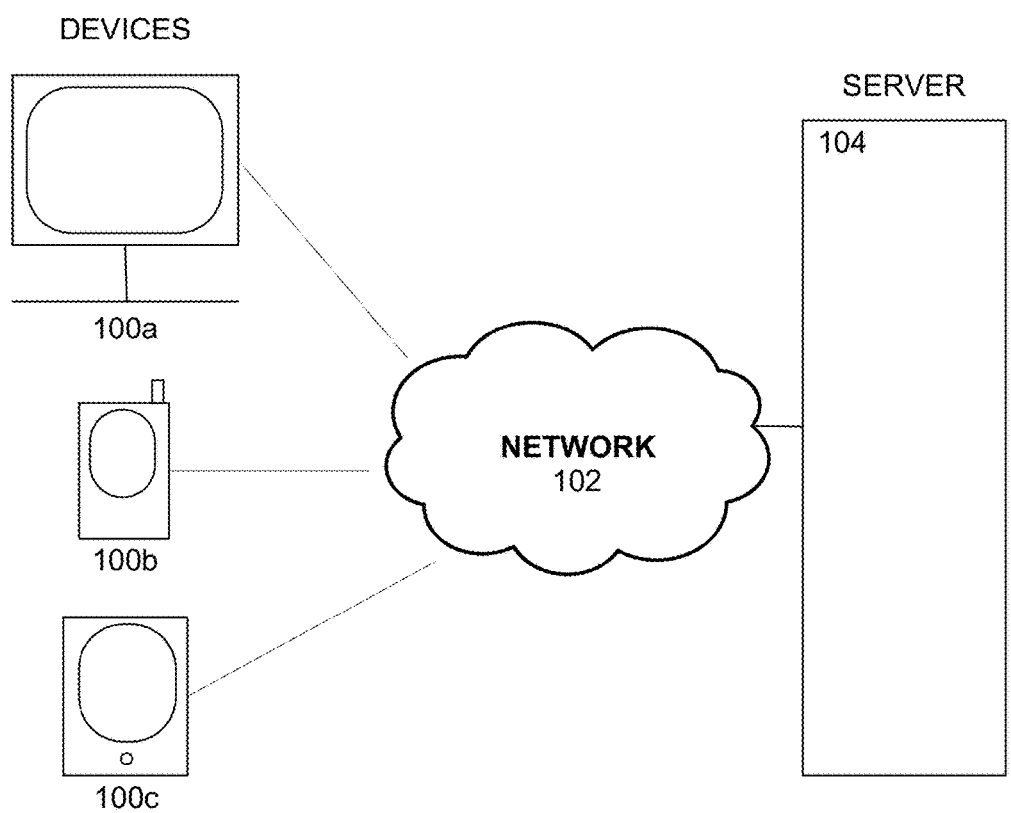
FIG. 1 shows a plurality of devices capable of communicating with a server over a network.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for communication facilitation in accordance with aspects of the invention. Various aspects of the invention described herein may be applied to any of the particular applications set forth below or for any other types of communication situations.

The invention may be applied as a standalone system or method, or as part of an employee communication management package, or health care management system. It shall be understood that different aspects of the invention can be appreciated individually, collectively, or in combination with each other.

In order to converge onto an innovative solution for the foregoing problems, the caller need not have apriori knowledge of the recipient's address. In traditional communication models, the burden and benefits of initiating a transaction lies entirely with the caller. In short, two assumptions are at the foundation of traditional calling systems: 1) the caller is burdened with having to find the recipient, and 2) the caller has the sole benefit of knowing the context of the pending communication. The recipient is, in effect, completely oblivious to the pending communication transaction until the very last moment when he or she enters into a state of exchange with the caller. Put in other terms, in traditional systems, there is no pre-communication disclosure to the recipient to place the inbound communication in context. While Caller ID could be considered a form of rudimentary disclosure, it does not offer any rich or reliable context as to the pending communication. The paucity of information can be quickly reinforced once realized that in the workplace Caller ID's usually display a generic corporate number, such as 949-240-1000 which may be the main hospital number for a fictitious hospital in this example. This simply indicates that the individual originating the call is within the hospital, and nothing more. Indeed, it is a credit to human heuristic thinking that individuals can extract so much contextual information simply from caller ID. Based upon various fuzzy parameters, such as time of day, recent personal activities and other seemingly unrelated factors, the recipient of a call can make an educated guess as to the context of a communication even when the number is generic. However, to achieve a real-time enterprise, one cannot rely upon "educated guessing."

Systems and methods which may enhance communication and collaboration may discard the two fundamental assumptions above. This solution may provide pre-communication disclosure to the recipient so that—based upon workflow and personal templates—the recipient can guide the caller into the best means of reaching the recipient at that moment in time. This may relieve the caller from the burden of having to find the target's electronic address since it is now the recipient's template that becomes the arbitrator, or broker, of the communication, not the caller. In other words, it is the recipient who may decide what address to offer the caller on the fly, and it shall not longer be the responsibility of the caller to iterate through known addresses to find the recipient. In some instances, a third party who may be associated with the recipient may determine which contact to offer the caller on the fly. In some instances, a recipient may have a device that may be capable of receiving and/or accessing communications for a plurality of contacts (e.g., one or more phone numbers and/or one or more emails).

The following provides an example of a comparison that may be made between traditional communication systems, and systems and methods for facilitated communication provided in accordance with aspects of the invention. Such a comparison is provided by way of example only and is not limiting.

In a traditional communication model, individuals have to publish their electronic addresses to other individuals whom they think may wish to contact them at some point in the future. By contrast, in a facilitated communication model provided in accordance with an embodiment of the invention, individuals do not need to disclose their electronic addresses. Their addresses may be held privately by a cloud software service.

Additionally, in a traditional communication model, when individuals change electronic addresses, they must re-disclose their new address to the same individuals above. In a facilitated communication model, individuals may simply update their private profile on the cloud software service.

Traditional communication models may require a caller to have access to the target individual's electronic address (e.g. phone number, pager, email) in order to initiate a communication transaction. In some embodiments, in a facilitated communication model, a caller does not need to know the recipient's target address. The caller may simply access the cloud name directory, which does not disclose the private recipient addresses.

If the caller has access to the target's valid electronic addresses, in traditional communication models the Caller has to then "guess" which electronic address (phone versus pager versus SMS vs VM) is the best means of contacting the recipient at that moment in time. However, facilitated communication models may offer the best method of contacting the recipient at that moment in time to the caller on the fly based upon target individual's workflow and personal templates.

In a traditional communication model, there is no pre-call disclosure. Recipient has no access to any pre-communication information other than Caller ID, which is often generic in a healthcare enterprise. By contrast, in a facilitated communication model, there may be a pre-call disclosure. A recipient may have access to a rich set of pre-communication information. This data may be routed to the recipient's workflow and personal templates to determine the best means of consummating the communication at that moment. In some embodiments, this pre-call disclosure may be an SMS that is sent to the recipient in advance of the communication to provide additional pre-call disclosure and context to the recipient.

Also, in traditional communication models, in the case of a phone call: the call may originate from a caller and goes to a recipient. Thus the caller's private number is disclosed to the target through Caller ID. This form of address diffusion leads to compromised privacy (e.g. when calling a patient's family). In the case of a phone call in a facilitated communication model, the call may originate from the cloud to both caller and recipient. Since a rich set of pre-call disclosures may be available to both caller and recipient, Caller ID may no longer be relevant and the cloud service may not disclose the Caller ID to either party, or may disclose a software system generic Caller ID. Neither caller nor recipient needs to learn the phone number of the other. Privacy may be maintained.

FIG. 1 shows a plurality of devices capable of communicating with a server over a network, in accordance with an embodiment of the invention. The plurality of devices 100*a*, 100*b*, 100*c* may communicate with a server 104 over a network 102.

The devices 100*a*, 100*b*, 100*c* may be network devices. Network devices may include computers whether they be a personal computer, server computer, or laptop computer; mobile devices, such as a tablet, personal digital assistants (PDAs) such as a Palm-based device or Windows CE device; phones such as cellular phones, smartphones (e.g., iPhone, BlackBerry, Android, Treo); pagers; a wireless device such as a wireless email device or other device capable of communicating wirelessly with a computer network or other communication network; or any other type of network device that may communicate over a network and handle electronic transactions, including any such technology embedded in watches, jewelry, or other personal items such as clothing, glasses or contact lenses. The device may be any device capable of electronically sending and/or receiving a communication. One or more of the devices may be handheld devices. The devices may be mobile devices. The devices may be sized and/or configured to be carried by an individual. Any discussion herein of computers or mobile devices may also be applied to any other network devices as provided.

The devices may be the same type of device and/or may include different types of devices. For example, the devices may be a computer 100*a*, a smartphone 100*b*, and/or a tablet 100*c*. Alternatively, the devices may all be mobile devices.

The device may be capable of sending and/or receiving one or more type of communication. For example, a device may receive one or more of, two or more of, or three or more of a phone call, voicemail, text/video message, page, chat message, and/or email.

The devices may belong to individuals interacting with a communication facilitation system, as described herein. For example, the devices may belong to one or more sender or recipient. Devices may belong to one or more employees of an entity. An entity may be an organization, association, company, partnership, employer, or any other entity. In some embodiments, the entity may be a hospital, health care provider, or any other entity that may benefit from providing communications to mobile employees. Individuals interacting with a communication facilitation system may include a health care professional including but not limited to a doctor, nurse, clinician, hospital employee, physician's office employee, emergency technician, administrative staff, emergency staff, and/or any other health care professional. In some embodiments, individuals will include patients, their families and friends, and the families and friends of healthcare professionals. In some instances, individuals may be any human.

The devices 100*a*, 100*b*, 100*c* may communicate with a web server 104. The communication between a network device and a web server may be, for example, a connection between a client computer and a website server over a network 102. One or more servers may communicate with one or more computers or other network devices across a network. For example, a plurality of devices may communicate with a single server, or with a plurality of servers. Any description herein of a server may apply to a single server or a plurality of servers. Any description herein of a server may apply to a cloud computing type infrastructure. Cloud computing may include provisioning of dynamically scalable and/or virtualized resources. One or more resources (e.g., memory, processors) may be distributed over one or a plurality of machines.

The network 102, for example, can include a private network, such as a LAN, or interconnections to the online organizations over a communications network, such as the Internet or World Wide Web or any other network that is capable of communicating digital data, such as a wireless, cellular, data transfer, or telecommunications network. Each computer or other network device may connect to one or more web server over the network using data protocols, such as HTTP, HTTPS and the like. In one example, a workflow engine may reside on a computer separate from a web/application server that is on the same LAN as the web/application server.

A user, such as a health care professional, other employee or employer, may interact with a mobile device (e.g., tablet, smartphone) or other network device that may be part of an communication facilitation system. When a computer or other network device is communicating with the web server, the device may have a processor and a memory that may store an operating system (OS) and a browser application or other application to facilitate communications with the web server. For example, the operating system may operate to display a graphical user interface to the user and permit the user to execute other computer programs, such as the browser application. The browser application, such as Microsoft Internet Explorer, Mozilla Firefox, Safari, when executed by the processor, permits the user to access the World Wide Web as is well known. Similarly, other applications or "apps" on mobile devices may be used. A mobile device, or other network device that may host the workflow designer may have a display which displays a graphical user interface. Any display known in the art may be used including, but not limited to, a cathode ray tube, a liquid crystal display, a plasma screen, a touchscreen, an LED screen, or an OLED display.

In some embodiments, the server may be owned and/or run by a communication facilitation entity. In some instances, the server may be owned and/or run by a third party that may communicate with an employee, employer, sender, recipient, and/or any other entities described elsewhere herein. Alternatively, the server may be owned and/or run by any entity described herein. The server may be part of a communication facilitator. The server may facilitate communications between a sender and a recipient. The server may facilitate communications between one or more senders and one or more recipients. Any description herein of communications between a sender and recipient may apply to any number of senders and/or recipients. For instance, the sender and recipient may be any individuals (e.g., humans) or entities. In some embodiments, the sender may be a caller needing to speak with a health care professional, and the recipient may be the health care professional. In some instances, a sender may simultaneously send communications to a plurality of recipients. The recipients may have the same or different templates which may handle how the communications occur. Systems and methods described herein may facilitate/broker communications between any two individuals or entities, or any number of individuals or entities.

The devices and/or server may include one or more processor and/or memory. The processor may be capable of executing one or more step that may facilitate communications between a sender device and a recipient device. One or more steps may occur as dictated by one or more set of rules. The rules may permit automated communication facilitation based on a set of one or more conditions. For example, the rules may determine a mode of communication (e.g., call, text, email or others) to be utilized and/or the contact information used in that mode of communication (e.g., a work email versus a personal email) based on pre-defined scenarios. The rules may also determine what information is to be collected from a sender or peripheral information source in order to determine which scenario is occurring at the time of communication and/or to determine the pre-disclosure provided to a recipient. The processor may permit the automated communication facilitation without requiring human intervention at one or more steps. The devices and/or server may have memory that may include non-transitory and/or tangible computer readable media which may contain instructions, logic, data, or code that may be stored in persistent or temporary memory of the device and/or server, or may somehow affect or initiate action by the device and/or server. The memory may include one or more databases.

Figure 2:
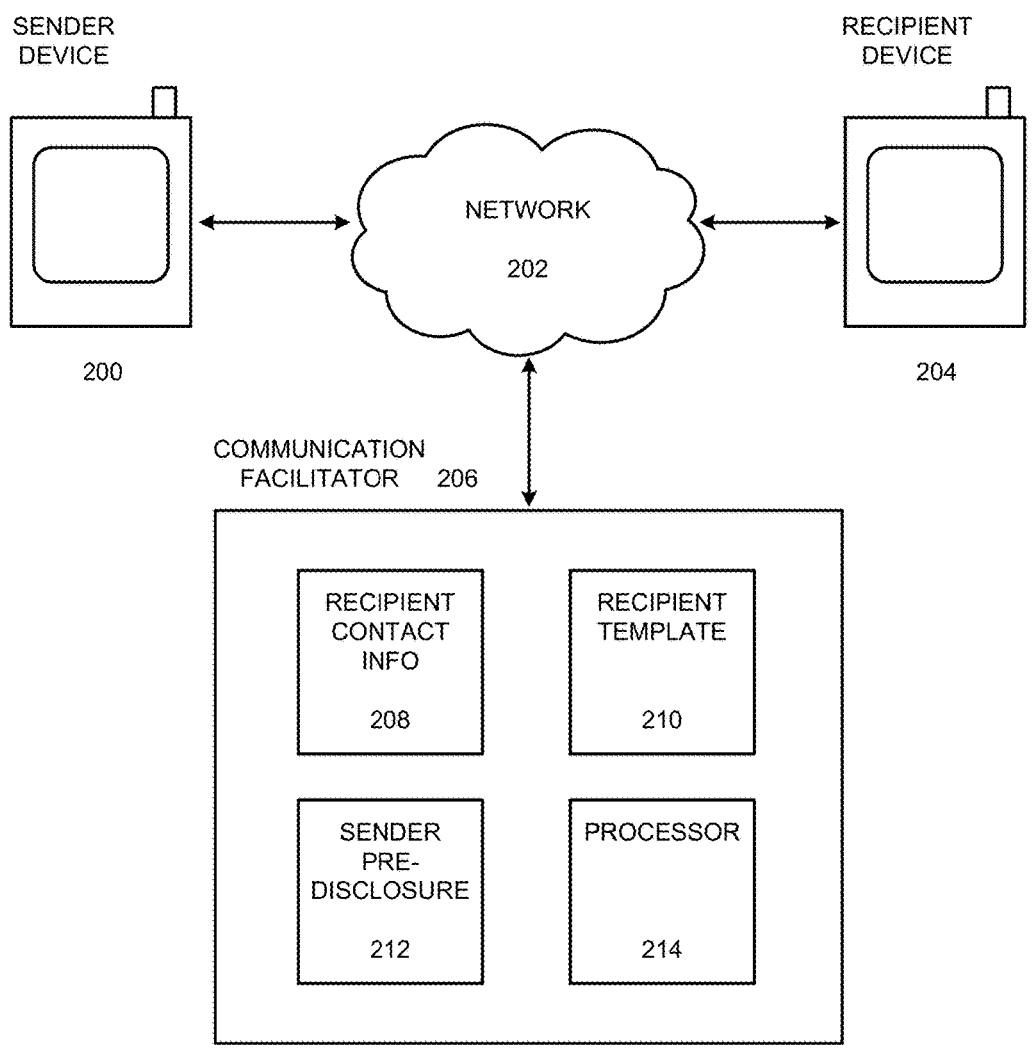
FIG. 2 shows an example of a communication system with a sender device and a recipient device.

FIG. 2 shows an example of a communication system with a sender device 200 and a recipient device 204. The sender device may send information to the recipient device. The sender device may send information that may be accessible by the recipient device.

The sender device and/or recipient device may be any device as described elsewhere herein. The sender device and recipient device may be the same type of device. Alternatively, they may be different types of devices. In some examples, the sender device and the recipient device may be mobile devices. The sender device and/or recipient device may be capable of sending and/or receiving a phone call. The sender device and/or recipient device may be capable of accessing (e.g., sending and/or receiving) email and/or voicemail.

The sender device may send information to a recipient device and/or send information that may be accessible by the recipient device over a network 202. The network may include any of the networks described elsewhere herein. The network may be a phone and/or data network.

A communication facilitator 206 may part of the communication system. The communication facilitator may communicate with the sender device 200 and/or recipient device 204 over a network 202. The communication facilitator may be provided on a cloud computing-based infrastructure. The communication facilitator may be provided on one or more server.

The communication facilitator may receive one or more communications from the sender device. The communication facilitator may perform one or more step based on the information received from the sender device. The communication facilitator may provide one or more communications that may be received by and/or accessible by the recipient device.

The communication facilitator 206 may include recipient contact information 208, recipient template 210, and/or sender pre-disclosure 212. Such information may be stored in the memory of a communication facilitator. The memory may also include non-transitory computer readable media that may include code, logic, and/or instructions for carrying out one or more steps with the information. The memory may be provided in one database or a plurality of databases. The memory may be distributed over the cloud. The communication facilitator may also include a processor 214. The processor may carry out the one or more steps described herein. The processor may carry out one or more of the steps automatically without requiring human intervention.

The recipient contact information 208 may include various ways of contacting the recipient. For example, the recipient contact information may include one or more phone number associated with the recipient. The information may also include one or more email associated with the recipient. The information may include any other way of getting in touch with a recipient, which may include a recipient website or social networking page. The phone number and/or email may include work contact and/or personal contact. Any of the recipient contacts may be used by the recipient device. For example, the recipient device may be capable of receiving telephone calls for one, two, three, four, or more recipient phone numbers, which may include one or more recipient work phone number and/or one or more recipient personal phone number. The recipient device may be capable of receiving voicemails and/or text messages associated with the phone numbers. The recipient device may be capable of receiving one or more direct chat message and/or messenger message associated with the device. The recipient device may be capable of receiving and/or accessing one or more email messages that may be provided at an email account accessible by the recipient device.

The recipient contact information may be updated at the communication facilitator. For example, if a recipient changes the recipient's phone number, email address, or any other type of contact information, the recipient may update the recipient contact information. This may provide a centralized location that may be updated rather than causing the recipient to have to inform individuals of the recipient's contact information change Since senders need not know the recipient's contact to initiate a communication via the communication facilitator, the senders need not be updated with the recipient's new contact information. The recipient contact information may be kept up-to-date to ensure that the recipient is reachable, even if senders do not know the recipient's contact information.

The recipient template 210 may include one or more rules or steps that may be associated with a method for facilitating communication. For example, the recipient template may determine which contact information for the recipient to use, depending on the situation. Situations may include factors such as time of day, day of the week, date, scheduled events, type of communication (e.g., work/personal), subject of communication (e.g., patient care, operations, finances, etc.), urgency (e.g., urgent, non-urgent, or any time limit to act on the communication (e.g., action required within 1 hour, 10 minutes)), sender (e.g., co-worker, family, friend), and/or any other information. For example, at certain times of the day the recipient may prefer to receive email in certain situations over telephone calls. At other times of the day the recipient may prefer to receive telephone calls. Depending on the time and/or situation, the recipient contact may be selected. Such determination of the contact information to use may be determined on the fly. The determination of the contact information may depend on one or more of the following: one or more rules pre-defined by the recipient, one or more rules pre-defined by a third party (e.g., employer of the recipient), and/or peripheral information (e.g., time, recipient's calendar). The determination of the contact information may depend on information provided by the sender. The information provided by the sender may include information about the situation (e.g., patient care, urgency). Examples of the recipient template process may be described in further detail elsewhere herein.

The recipient template may include one or more steps that may depend on input provided by the sender. For example, the recipient template may generate one or more questions or choices for the sender. The sender may respond to the questions and/or choices. Depending on the sender response, additional questions and/or choices may be displayed to the sender, or the recipient template may instruct the communication facilitator to perform one or more step. In some instances, the sender responses may be collected and/or used to generate sender pre-disclosure 212. The sender pre-disclosure may include responses made by the sender (e.g., work or personal, patient care or other, urgency). The sender pre-disclosure may include additional information that may be provided and/or generated based on the sender responses or sender location as determined by Global Positioning Systems (GPS). The pre-disclosure may include identifying information about the sender and details about the communication, such as type of communication, source of communication, importance of communication, urgency of communication, and/or any other details about the communication, or location of the sender.

The pre-disclosure may be sent to the recipient device. For example, if the recipient template determines that a call is to be made to the recipient device, the recipient device may show the incoming call along with the sender pre-disclosure. The pre-disclosure may arrive in advance of the call, or at the same time as the call. The pre-disclosure may an SMS, an email, an Instant Message, a software application mediated alert displayed on a screen, or as an audio message or alert tone. If the recipient template determines that a voicemail is to be left, the voicemail may include a header or information including the sender pre-disclosure. The recipient template may consider real-time GPS information about location of the recipient or sender or third parties, or locations objects, such as the location of a nearby computer or mobile device. If the recipient template determines that an email is to be left, the email may include a header or information including the sender pre-disclosure. The sender pre-disclosure may include other information provided by the sender. In some embodiments, the pre-disclosure may be sent to one device, while the incoming communication is routed to a different device based upon recipient template preferences as determined by recipient templates. For example, the pre-call disclosure may be sent to a display screen or contact lenses or ear headsets, while the communication is routed to a nearby phone based upon recipient GPS information.

The communication facilitator may be in one way and/or two-way communication with the sender device and/or the recipient device. The communication facilitator may receive a request from the sender device to provide a communication to the recipient device. For example, the sender may wish to initiate a call with the recipient or get in contact with the recipient in another manner. The communication facilitator may collect information from the sender about the nature of the communication. For example, the communication facilitator may send questions and/or options to the sender to collect more information about the communication (e.g., work or personal, patient care or other, urgent or not urgent). The communication facilitator may receive one or more responses from the sender to the questions and/or options. Based on the sender responses, the communication facilitator may or may not send additional questions to the sender device. The questions selected to be sent to the sender device may depend on earlier sender responses.

After sufficient information has been collected, the communication facilitator may determine the mode of communication for the recipient device. The communication may send a communication to the recipient device in the selected mode of communication. The communication may include pre-disclosure which may include information provided by the sender. Such pre-disclosure may include information such as the sender's name, contact information, nature of communication (work or personal), specific details about the communication (patient care or other), urgency of communication, and/or any other information that may be useful.

Such pre-disclosure may be displayed on a display of a recipient device. The pre-disclosure may be displayed on a graphical user interface of the recipient device, which may or may not accept an input from the recipient. The input may include whether the recipient accepts the communication, or may include any other action or inaction the recipient may take in response to the communication. The communication facilitator may be capable of one-way and/or two-way communication with the recipient device. The communication facilitator may send the pre-disclosure information and/or communication to the recipient. The communication facilitator may receive a response from the recipient device (e.g., whether to accept the communication, or any action or inaction to take in response to the communication).

In some instances, the communication facilitator may include a directory. The directory may be organized in any manner. In some instances, the directory may be organized by entity (e.g., employer, hospital, etc.). The directory may or may not be further organized by department or group. The directory may be searchable. A recipient's name may be selected from the directory. For example, if the directory is a hospital or another medical care facility, the user may be able to search all hospital employees, or may be able to search by department or specialty (e.g., emergency medicine, cardiology, pathology, etc.). The user may be able to search by position (e.g., physician, surgeon, nurse, administrator, etc.). The user may be able to search for specific contact names.

The directory may be displayed on a display of a sender device. For example, the directory may be displayed on the screen of a mobile device or computer. The directory may be displayed on a graphical user interface which may receive user input. For example, a sender may be able to scroll through the directory or search the directory using one or more search criteria. The sender may be able to select a contact and initiate a communication.

Figure 3:
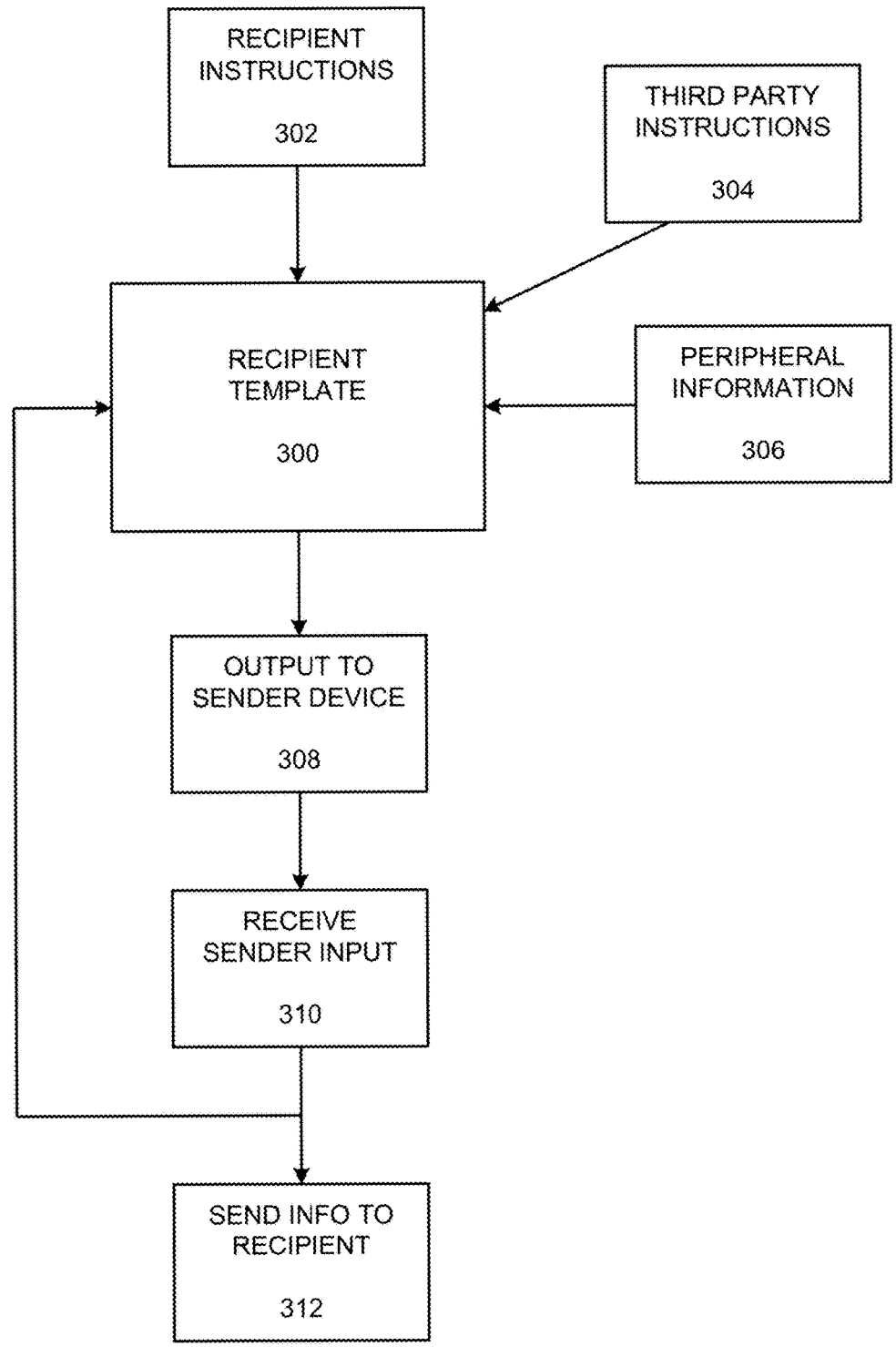
FIG. 3 shows an example of a method utilizing a recipient template for communications.

FIG. 3 shows an example of a method utilizing a recipient template 300 for communications. A recipient template may be used to determine the type of communication and/or the nature of communication that is provided to and/or accessible by a recipient device. The recipient template may be used to gather information from a sender device which may assist with said determination.

A recipient template 300 may determine a communication provided to a sender and/or recipient based on information received by the recipient template. The information received by the recipient template may include but are not limited to one or more of the following: recipient instructions 302, third party instructions 304, peripheral information 306, and/or sender input. The recipient template may make such determination based on one or more of the information sources, two or more of the information sources, three or more of the information sources, or four or more of the information sources.

Recipient instructions 302 may include one or more rules that may pre-set by the recipient. For example, if a recipient is an employee, such as a physician, nurse, or other health care professional, the recipient may indicate that the recipient prefers to receive emails at certain hours for certain types of situations (e.g., during working hours, non-urgent), and phone calls at those hours for other types of situations (e.g., during working hours, urgent). The recipient may have preferred mode of contact (e.g., text message, personal email address) at other hours (e.g., non-working hours). The recipient may set the rules ahead of time. The recipient may provide the appropriate contact information for the various situations. For example, during working hours, the recipient may have emails routed to the recipient's work email address, and during off-hours, the recipient may have emails routed to the recipient's personal email address. The rules set by the recipient may apply generally over time (e.g., every day from 9-5 work hour situations may apply; or every Monday, Wednesday, Friday from 8-8 work hour situations may apply). Or the rules set by the recipient may apply to one-time situations (e.g., a surgery scheduled for a particular date at a certain time, no phone calls). The rules set by recipient may be set by the recipient or sender's GPS information.

Third party instructions 304 may be relied upon. The third party may be any party that may interact with the system. In one example, the third party may be the recipient's employer. In some embodiments, both third party and recipient instructions may be relied upon. In some instances, the third party instructions may take precedence over the recipient instructions. In other instances, the recipient instructions may take precedence over the third party instructions. There may certain types of instruction situations where the third party instructions take precedence over recipient instructions and certain types of instruction situations where recipient instructions take precedence over third party instructions. For example, during certain on-call hours, the third party may set certain types of urgent communications to go as a phone call to the recipient's device, and the recipient may not be able to change that to e-mails. However, if during work-hours the recipient has a surgery scheduled, the recipient may be able to make all communications go to voicemail or email.

In certain situations it may be preferable for third party instructions to have precedence over some of the recipient's instructions. For example, if the third party is the hospital or clinic and the recipient is a health care professional, the hospital may ensure that the employee is accepting certain important communications in a real-time manner. If the third party is an employer and the recipient is an employee, the employer may be able to ensure that the employee is getting certain important communications in a real-time manner. This may be determined for certain hours (e.g., work hours, on-call hours), or certain levels of importance (e.g., the most urgent or life threatening cases only off-hours).

Peripheral information 306 may assist with determining a recipient template. For example, a recipient's schedule may be stored on a device or cloud. One example may be the recipient's electronic calendar, which may include appointments or actions to be taken by the recipient. Other examples may include a clock, which may include time of day, day of the week, and/or date or GPS location information of either recipient or sender. Emails or other communications may be used to determine whether a recipient will be at an appointment or performing certain actions at certain times. In some instances, a third party calendar or other information relating to a third party may be used. For example, the third party calendar may note that certain employees will have to attend a mandatory training session at a particular time. In some instances, the third party information may be GPS related information about sender, recipient, third parties (such as a family member) or the location of objects.

Such peripherals may assist with determining a situation that a recipient is in, which may assist with determining the mode of contact for the recipient at that time. Alternatively, the recipient may self-identify certain situations that the recipient will be in. The peripherals and/or self-identification information may identify the type of situation that recipient will be in (e.g., work-related crucial, work-related less important, personal crucial, personal less important), which may assist with determining the contact mode for the recipient at that time.

The recipient template may also depend on sender input. For example, the recipient may have one or more set of rules that may be pre-determined for various scenarios based on recipient instructions and/or third party instructions. Peripheral information may be used to assist with determining the scenarios. Sender input may also assist with determining the scenarios (e.g., whether the communication is work related or personal, what the communication pertains to, urgency).

The recipient template 300 may generate an output to be sent to the sender device 308. Such an output may include a question for the sender. The question may be in the form of one or more options (e.g., binary choice, multiple choice, select from options, receive text, value, or other information). The output may be displayed on the sender device. The output may be displayed on a user interface. The user interface may receive an input from a sender in response to the displayed output. The sender input may be received 310. The sender input may be provided to the recipient template which may provide additional questions in response to the sender input.

Alternatively, no additional questions may be needed, and information may be sent to the recipient 312. The information sent to the recipient may be a communication initiation or may be sent in advance of the communication initiation. This may include a phone call, direct voicemail, text message, and/or email. In some instances, a voicemail may be transcribed to a text message or email. In some embodiments, a text message and/or email may be read be transformed into an audio file which may recite the contents of the message.

The information sent to the recipient may also include pre-disclosure information. Such pre-disclosure information may be viewable by the recipient (or may be audio content played to the recipient) before the recipient answers a call, listens to a voicemail, or reads a text message and/or email. Such pre-disclosure information may arrive in advance of the communication itself, or at the same time as the communication. Such pre-disclosure information may include identifying information about the sender (e.g., sender's name, position, phone number, email, other contact information, records associated with the sender including medical or financial records, or location), nature of the communication (e.g., work or personal), additional details about the communication (e.g., patient care, medical emergency, administrative, financial, family, other), urgency (e.g., very urgent, urgent, somewhat urgent, not urgent), and/or any other information that may be useful for the recipient to know about the communication or that may be requested ahead of time by the recipient and/or third party.

The pre-disclosure information may be displayed on a screen or other display of the device or may be play as an audio and/or video file of the device. In response to the information sent to the recipient, the recipient may choose to take an action or inaction. The action may be answering a call, selecting a call snooze option, sending a call to voicemail, listening to a voicemail, opening and/or reading a text or page, opening and/or reading an email, initiating a new call, text, page and/or email. An example of an inaction may include ignoring a call, voicemail, text, page, and/or email. The snooze option may notify the sender of the snooze action, reminder the sender to reattempt contact at a future date and time, or cause certain other actions based upon recipient, sender or third party templates. For example, a snooze action by the recipient may route the communication to another recipient with the same pre-call disclosure.

Illustrations may be provided of scenarios between two hypothetical users. Examples of users may include a sender and a recipient. Examples of user stories may be provided which can demonstrate how communications systems described herein may operate in real-life scenarios.

Figure 4A:
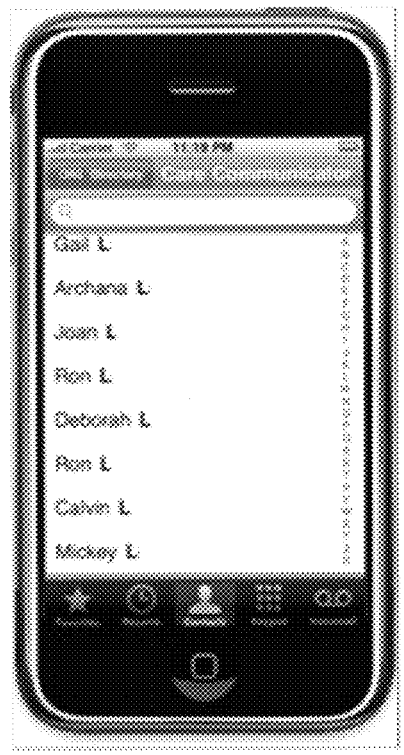
FIG. 4A provides an example of a directory that may be provided in accordance with an embodiment of the invention.

FIG. 4A provides an example of a directory that may be provided in accordance with an embodiment of the invention. The directory may be displayed on a device. A sender wishing to initiate a communication with a recipient may view a directory to which the recipient may belong. In some embodiments, the directory may have one or more organizational features and/or search features. The directory may be organized by all employees, or may be organized by health professional type, department, group, experience, seniority, position, geographic location, specialty (e.g., medical specialty), or any other grouping. A user may be able to search for an individual using one or more search criteria, which may include any organizational feature, or any other feature. Potential recipients may be listed in the directory. The recipients may be listed in alphabetical order or any other order.

The contact information of the recipients may be kept private. For example, the directory may list a potential recipient's name without listing the recipient's phone number and/or email address. A communication may be initiated with the recipient without the sender knowing the recipient contact information. The sender may access the recipient through the directory, which may provided via a communication facilitator, and the communication facilitator may have the contact information for the recipient. The communication facilitator may initiate the contact with the recipient, using the appropriate contact information. The communication facilitator may connect the sender to the recipient through the appropriate contact mode. Alternatively, certain public contact information for a recipient may be displayed.

In some embodiments, an organization (ORG) directory in the cloud may provide an enterprise list of targets to select. In some instances, this is not the same list of Active Directory users in the ORG domain since other members of the care ecosystem working in collaboration with ORG, but not necessarily ORG employees would be listed as well. ORG may be the steward of the cloud-list.

Figure 4B:
FIG. 4B shows an individual who has been selected as a recipient.

FIG. 4B shows an individual who has been selected. For example, Physician Lin Right has been selected. Dr. Right may have been selected from the directory. The nature of the communication request may be selected from Dr. Right's template. This may be either a custom template for Dr. Right, or may be an enterprise template, which she selected. In this example, the first query to the sender may ask if the communication is of "work" or "personal" nature.

Figure 4C:
FIG. 4C shows a follow-up query to a first query to the sender about the nature of the communication.

FIG. 4C shows a follow-up query to the first query. For example, once the caller selects "work" as the nature of the communication, the template may offer additional options. For example, in this situation, the follow-up query may ask if the communication is regarding "patient care" or "other." This query may be selected from a list of queries or may have been custom-created. This query may have been selected or created by Dr. Right, or by a third party. This caller would like to talk to Dr. Right about a patient care matter.

Figure 4D:
FIG. 4D shows an additional follow-up query regarding the nature of the communication.

FIG. 4D shows an additional follow-up query. The template may go on to inquire if the patient care matter is of urgent importance or not.

Figure 4E:
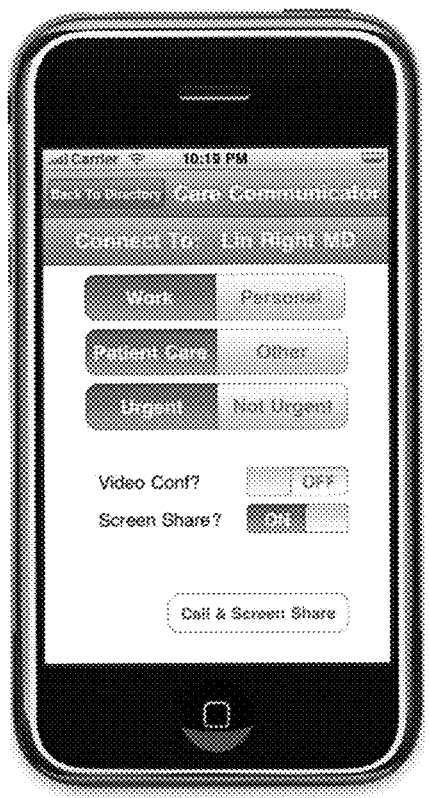
FIG. 4E shows communication options after the queries have been completed.

FIG. 4E shows communication options after the queries have been completed. The caller may have deemed a matter as urgent. Dr. Right's template may have additional options that will be offered in the event of an urgent call regarding patient care. Dr. Right may realize that such discussions may benefit from a video call with screen sharing. Note that even though both are offered, the caller may turn down the video nature of the call, but does turn on screen sharing. Once the Dr. Right's template has been fully traversed, the appropriate call button may appear, in this case to initiate a voice call plus share the screen (presumably to review medical images with Dr. Right). In some embodiments, the caller does not know, nor can see on the screen the phone number for Dr. Lin Right, the target.

Figure 4F:
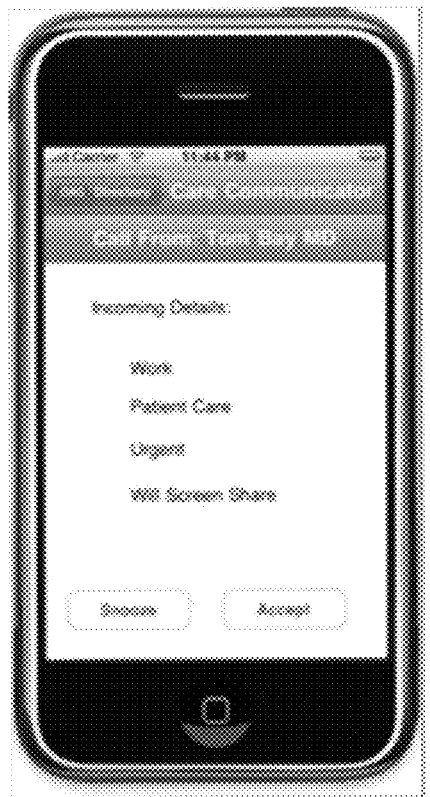
FIG. 4F shows an example of a recipient device display upon initiation of a communication request.

FIG. 4F shows an example of a recipient device display. Dr. Lin Right may be notified of an incoming call from Dr. Tom Bay. Dr. Right may note that this incoming call is about a urgent patient matter and screen sharing is about to be engaged. This pre-call disclosure may be useful for Dr. Right in determining whether to respond or how to respond to the incoming call. Moreover, Dr. Right may have the option of requesting a snooze for this call that results in a series of actions. In short, the cloud-based solution may attempt to reconnect or prompt the reconnection of Dr. Right and Dr. Bay around this patient in 15 minutes.

Figure 5A:
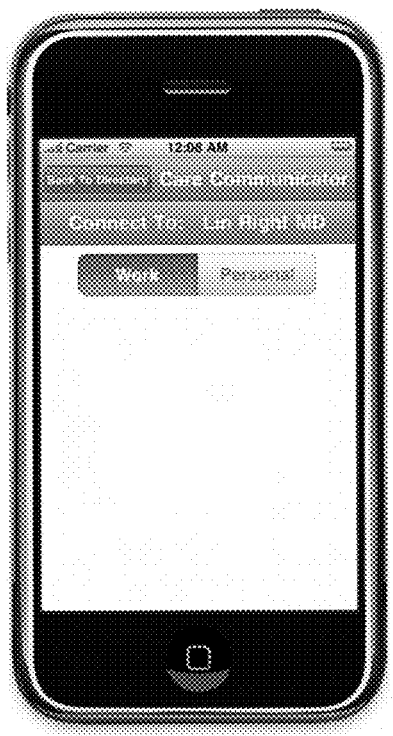
FIG. 5A provides an example of another scenario with a query regarding the communication.

FIG. 5A provides an example of another scenario. A similar scenario may be provided where the call is not urgent and Dr. Right is in the middle of a resident lecture, marked on his calendar.

Figure 5B:
FIG. 5B shows additional communication query options.

FIG. 5B shows an example of the scenario where the caller may select the appropriate fields from Dr. Right's template.

Figure 5C:
FIG. 5C shows an example of a scenario where the caller may note a non-urgent matter.

FIG. 5C shows the scenario where the caller may note this matter is not urgent. The template may make note of the lecture on Dr. Right's calendar and may branch to the following screen in FIG. 5D. The calendar may be an example of a peripheral source of information that may assist with determining the scenario into which the particular communication falls.

Figure 5D:
FIG. 5D shows another example of possible communication options once the queries have been completed.

FIG. 5D shows another example of possible communication options once the queries have been completed. The caller may be offered the option to leave a voice mail or send an email. Since the caller selected voice mail (and Dr. Right prefers to read email) the solution may offer the caller the option to transcribe the voicemail into email. Dr. Right decided to make this an option for the caller in her template, realizing that sometimes callers wish to leave sensitive messages that should not be put out on email. This caller elects not to have the voicemail transcribed. The button appropriately indicates the caller will be connected to voicemail. In some scenarios, the sender may be notified of the reason why that particular communication request from the sender has been routed to a specific recipient template. For example, in FIG. 5D, the sender may be notified of Dr. Right's lecture as the reason for offering "voice mail" or "email" as the only two possible choices. It can be seen how a recipients templates can include instructions on whether or not to disclose such causal information back to the sender in real-time, or at a later time.

Figure 6A:
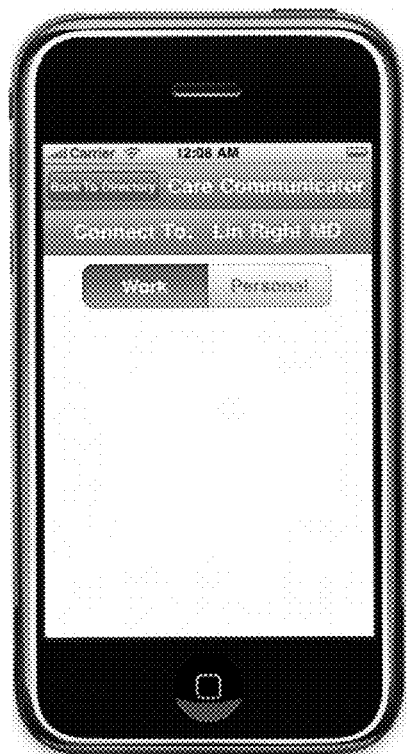
FIG. 6A provides an example of an additional communication scenario.

FIG. 6A provides an example of an additional scenario. In another use case, the nature of the call is not about patient care at all.

Figure 6B:
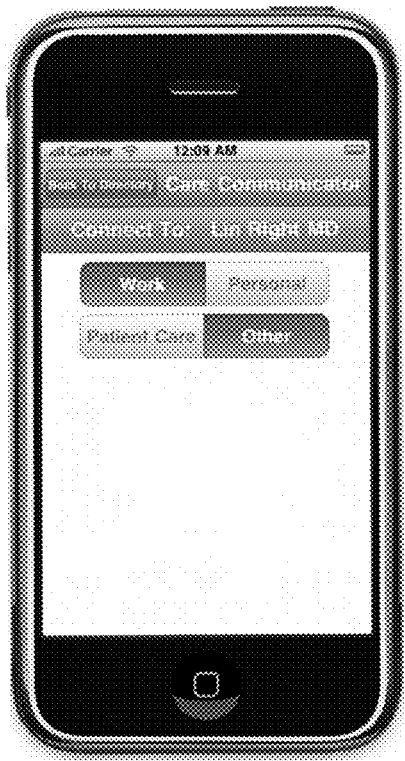
FIG. 6B shows an example where the sender may choose a query option.

FIG. 6B shows an example where the caller may choose another option from the query. The caller may select "other" from Dr. Right's template.

Figure 6C:
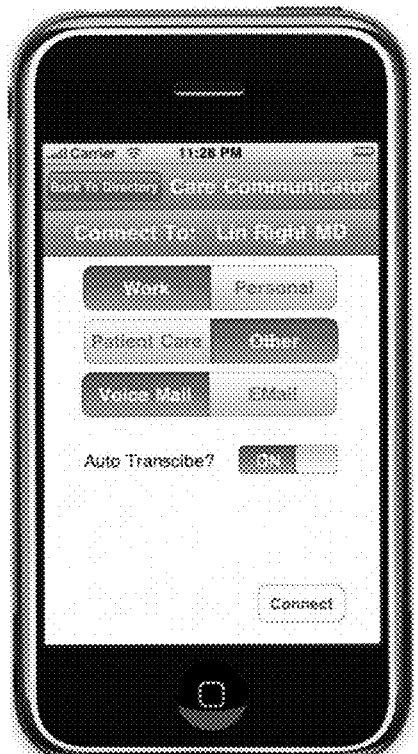
FIG. 6C provides examples of communication options once the queries have been completed.

FIG. 6C provides examples of communication options once the queries have been completed. For example, this call may have been operational, for example asking if Dr. Right is available to give a lecture. The voicemail transcription may allow the caller to speak the request and have it transcribed and moved into Dr. Right's email inbox or text message inbox. In some embodiments, the caller does not see, nor needs to enter Dr. Right's email address or phone number.

Figure 7:
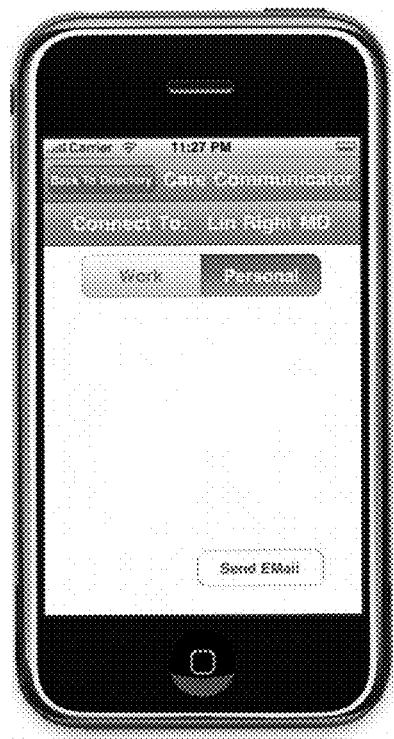
FIG. 7 provides an example of a scenario where the communication may be of a "personal" nature rather than a "work" nature.

FIG. 7 provides an example of a scenario where the communication may be of a "personal" nature rather than a "work" nature. Since Dr. Lin Right prefers to address non patient care matters with email during office hours, if the initial inbound request is of a personal nature, and the calendar notes that this is a request during office hours, the caller may be directed to email by the template. The system may be capable of automatically detecting the time and/or whether the communication attempt is made during office hours or off-hours. Note the "caller" may be converted to an email writer and the button may be appropriately modified to indicate this. Upon selecting this option, the caller may be provided an email application to complete the transaction.

Figure 8A:
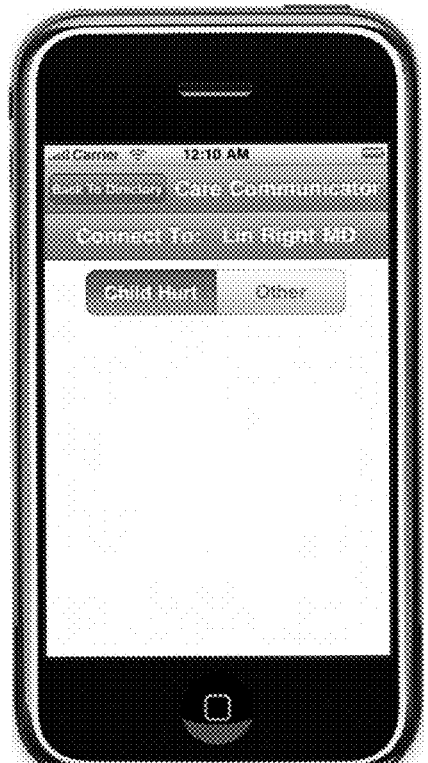
FIG. 8A provides an example of a scenario with a sender who may be a party other than someone related to the recipient's work.

FIG. 8A provides an example of a scenario with a sender who may be a party other than someone related to the recipient's work. For example, Dr. Right may also be a mother of 2 girls, ages 8 and 10. She may be listed as the primary emergency contact for her children at school. Since the communication facilitator (e.g., Care Communicator) may be cloud based, and the calls may be routed via her personal templates to her personal phone, Dr. Right may have set up the school nurse to be able to reach her via this cloud-based solution. Dr. Right may have a custom template for the school nurse, which may allow her to be better accessible for child-related emergencies. In some examples, Dr. Right partly enrolled into the communication facilitation program because of this personal benefit.

Figure 8B:
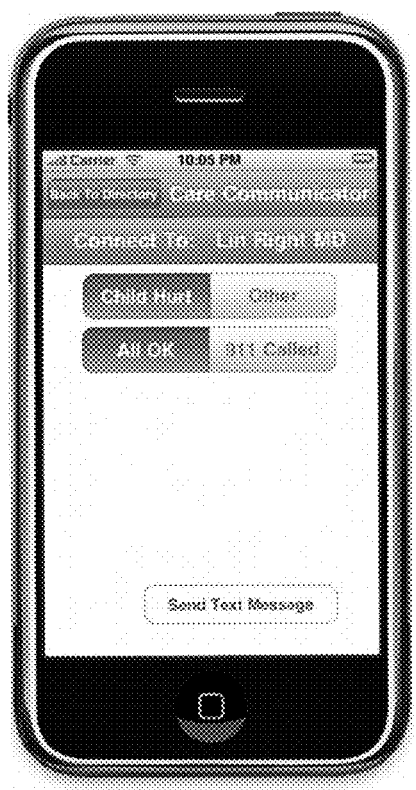
FIG. 8B provides a scenario where queries may be provided to the other party sender to collect additional information about the communication.

FIG. 8B provides a scenario where queries may be provided to the other party sender, such as the nurse, to collect additional information about the communication. For example, Dr. Right is a practical woman. She knows that sometimes kids do silly things, end up with a little scrape, cry a bit, and then are fine. Her template checks her work schedule, and at times when she is involved in patient care and her children are "all okay," Dr. Right simply wants to get a text message and nothing more. This template allows the school nurse to discharge her notification duties, but without disturbing Dr. Right during the middle of her workday for non-critical matters. Everyone is happy and workflow is not interrupted.

Figure 9A:
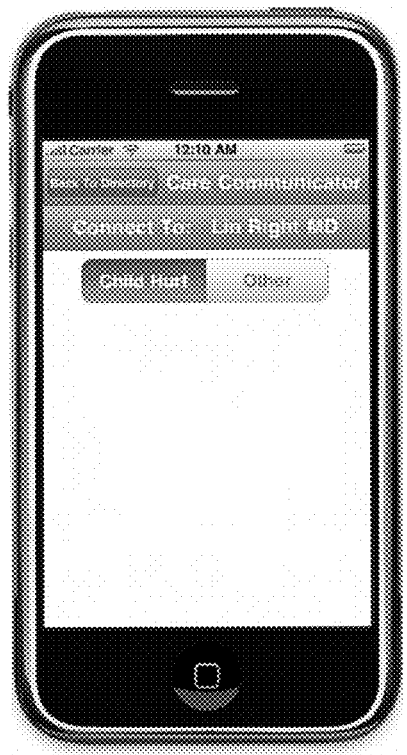
FIG. 9A provides an example of a scenario where based on the information provided by the sender, a communication mode may be selected.

FIG. 9A provides an example of a scenario where based on the information provided by the sender, a communication mode may be selected. For example, on the other hand, Lin's template also allows for priority calling if her children are hurt.

Figure 9B:
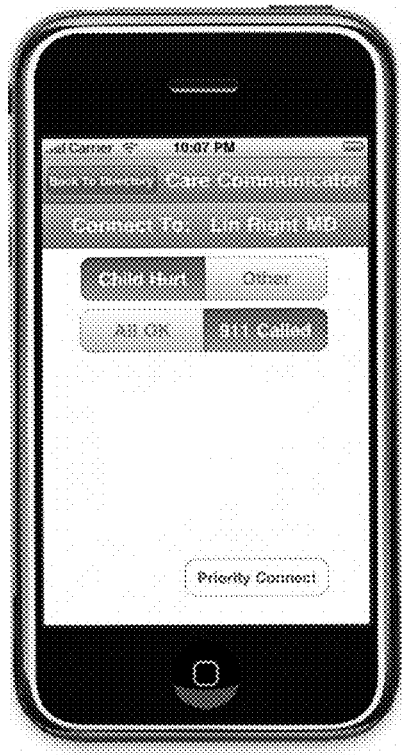
FIG. 9B provides an example where a recipient is notified of an emergency situation.

FIG. 9B provides an example where a recipient is notified of an emergency situation. Dr. Right was thrilled to be enrolled into the communication facilitation system because it not only improved her ability to work more effectively at work, but also gave her the reassurance that her personal life priorities, such as her children, could "punch through" and reach her via a priority call.

Figure 9C:
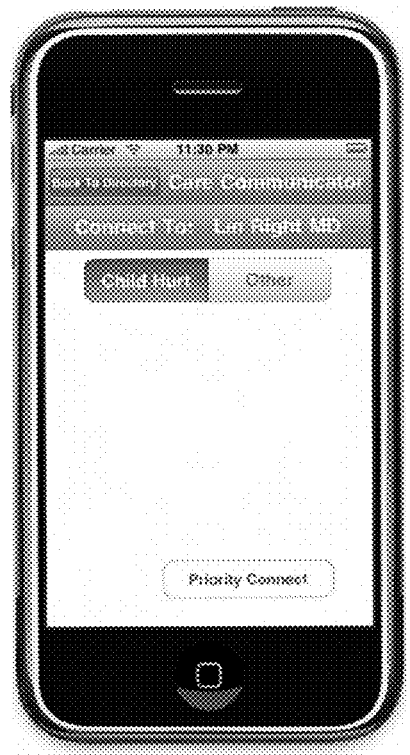
FIG. 9C shows another example of a scenario where further information relating to the situation was not collected.

FIG. 9C shows another example of a scenario where further information relating to the situation was not collected. Dr. Right wasn't always practical with school nurse calls. When she first moved, she had her template setup so any child related matters were routed to priority connect. As she developed comfort around her school, she modified her template to allow text messages for non-critical items. This template flexibility is applicable to both work and personal life.

A communication facilitator (e.g., Care Communicator) may promote the basic premise that we, as individuals, do not wish to carry multiple devices. The rhetorical question asked daily by just about every mobile healthcare worker is "when will I finally have just one device that does everything?" Naturally, the challenge is that each individual has a different preference as to what that "one device" should be. When discussing communication and collaboration with technology executives at large healthcare organizations, it's quickly obvious that they, too, desire the same "one device" approach, and even more so, they wish they could let each individual choose their own end-device. If each employee was able to use their own personal end device for workforce communications, this would have a significant positive impact at multiple levels: 1) the end-user's single-device dream comes true, and 2) the organization is not obliged to procure and issue multiple devices.

There may be potential complexities of using personal devices for workplace communication; however, it should be noted that this solution may optionally retain a complete log of all work-related transactions (recall the templates categories all calls). Hence, if required, accurate credit accounting could be maintained depending on circumstance. Even where such form of accounting was to be deemed necessary (similar to mileage reimbursement of cars), it would provide a much more financially efficient model than purchasing hardware for those same users (i.e. versus buying company cars for every employee). This system may break legacy thinking and embark on software based intelligent communication and collaboration paradigm.

This technology can be extended to patients, their family members and loved ones. Patients could contact care providers so that the template would guide the patient (or family member) to appropriate route without revealing the care provider's private address. Moreover, care providers could contact family members efficiently if the ORG directory were to include patient (or family members).

Although the healthcare industry is provided as an example of an application of the systems and methods described herein, other industries may utilize the systems and methods described herein. Other industries may include but are not limited to, finance, banking, consulting, emergency response, law enforcement, legal, education, technology, government, culinary, any service industry, any mobile industry, any industry that requires a rapid response, and/or any other industry. These systems and methods may be used by any employer and/or employee. The systems and methods may be used by any individual personally.

One or more characteristics, components, features, and/or steps known in the art may be incorporated and/or used. See, e.g., U.S. Pat. No. 6,798,772; U.S. Pat. No. 7,280,535; U.S. Pat. No. 6,952,468; U.S. Pat. No. 7,908,261; U.S. Patent Publication No. 2009/0280786; U.S. Patent Publication No. 2010/0203909; U.S. Patent Publication No. 2010/0286997, which are hereby incorporated by reference in their entirety.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of communication facilitation comprising:
receiving, at a communication facilitator, from a sender device, a communication request for a communication with a recipient device;
sending, from the communication facilitator, a query to the sender device, wherein the query is provided based on a recipient template that is generated based on instructions from a third party that is different from a sender using the sender device and from a recipient using the recipient device;
receiving, at the communication facilitator, from the sender device, a sender response to the query from the sender device; and
sending, at the communication facilitator, based on the sender response to the query, a communication to the recipient device.

2. The method of claim 1 wherein the recipient template is generated based on one or more of the following: recipient instructions, third party instructions, or peripheral information.

3. The method of claim 1 wherein the communication to the recipient device is provided using a mode of contact selected from a plurality of available modes of contact, based on the sender response to the query.

4. The method of claim 3 wherein the plurality of modes of contact including two or more of the following: video conference, screen share, voicemail, email, transcribed voicemail, text message, or call.

5. The method of claim 1 wherein the communication to the recipient device includes pre-disclosure information about the nature of the communication.

6. The method of claim 5 wherein the communication is a call and the pre-disclosure information is displayed on the recipient device.

7. The method of claim 1 wherein the sender device provides the communication request without utilizing contact information for the recipient device.

8. The method of claim 1, wherein the sender response includes contextual information based on the recipient template.

9. The method of claim 1, further comprising determining a mode of contact based on the sender response to the query and one or more rules, wherein the determined mode of contact is used for sending the communication to the recipient device.

10. A method of communication facilitation comprising:
receiving, at a communication facilitator, from a sender device, a communication request for a communication with a recipient device;
sending, from the communication facilitator, a query to the sender device, wherein the query is provided based on a recipient template that is generated based on a stored availability or identified location of a receiving party using the recipient device;

receiving, at the communication facilitator, from the sender device, a sender response to the query from the sender device; and sending, at the communication facilitator, based on the sender response to the query, a communication to the recipient device.

11. The method of claim 10 wherein the recipient template is generated based on one or more of the following: recipient instructions, third party instructions, or peripheral information.

12. The method of claim 10 wherein the communication to the recipient device is provided using a mode of contact selected from a plurality of available modes of contact, based on the sender response to the query.

13. The method of claim 12 wherein the plurality of modes of contact including two or more of the following: video conference, screen share, voicemail, email, transcribed voicemail, text message, or call.

14. The method of claim 10 wherein the communication to the recipient device includes pre-disclosure information about the nature of the communication.

15. The method of claim 14 wherein the communication is a call and the pre-disclosure information is displayed on the recipient device.

16. The method of claim 10 wherein the sender device provides the communication request without utilizing contact information for the recipient device.

17. The method of claim 10, wherein the sender response includes contextual information based on the recipient template.

18. The method of claim 10, further comprising determining a mode of contact based on the sender response to the query and one or more rules, wherein the determined mode of contact is used for sending the communication to the recipient device.

19. A method of communication facilitation between a sender device and a recipient device comprising:

generating, at a communication facilitator with aid of a processor, a recipient template configured to dictate one or more queries to be provided to the sender device prior to sending a communication to the recipient device;

sending, from the communication facilitator, a query to the sender device in accordance with the recipient template generated based on instructions from a third party that is different from a sender using the sender device and from a recipient using the recipient device;

receiving, at the communication facilitator, from the sender device, a sender response to the query from the sender device; and sending, at the communication facilitator, in accordance with the recipient template and based on the sender response to the query, a communication to the recipient device.

20. The method of claim 19 further comprising receiving one or more of the following template generation factor: recipient instructions, third party instructions or peripheral information;

and generating the recipient template based on the one or more template generation factor.

21. The method of claim 20 wherein the peripheral information includes one or more of the following: recipient's electronic calendar, time of day, date, or location information of the sender, recipient, third party, or object.

22. The method of claim 19 further comprising receiving input from the recipient device and/or a third party, at the communication facilitator, specifying one or more rules determining a mode of contact to the recipient device based on information collected from the sender or peripheral information; and generating the recipient template based on the received input.

23. The method of claim 19 wherein the one or more queries are provided in one or more of the following forms: binary choice, select one option from multiple choice, select multiple options from multiple choice, receive free-form text, values, images, or other information.

24. The method of claim 19 wherein the communication to the recipient device includes pre-disclosure information about the nature of the communication.

25. The method of claim 24 wherein the pre-disclosure information is provided based on the sender response to the query.

26. The method of claim 24 wherein the pre-disclosure information is provided based on peripheral information.

27. A communication facilitator comprising:

one or more communication interfaces capable of receiving, at the communication facilitator, information from a sender device and capable of sending information to a recipient device;

a memory storing recipient contact information and a recipient template, generated based on instructions from a third party that is different from a sender using the sender device and from a recipient using the recipient device and configured to dictate one or more queries to be provided to a sender device prior to sending a communication to the recipient device; and a processor configured to permit information to be sent to the recipient device via the communication interface, based on the recipient contact information and recipient template stored in the memory.

28. The communication facilitator of claim 27 wherein the memory also stores sender pre-disclosure, and wherein the processor is configured to permit information to be sent to the recipient device also based on the sender pre-disclosure.

29. The communication facilitator of claim 28 wherein the sender pre-disclosure includes one or more responses received from the sender device in response to the one or more queries.

30. The communication facilitator of claim 27 wherein the one or more communication interfaces are capable of receiving one or more communication requests from the sender device without receiving the recipient contact information.

31. A method of communication facilitation between a sender device and a recipient device comprising:

generating, at a communication facilitator with aid of a processor, a recipient template configured to dictate one or more queries to be provided to the sender device prior to sending a communication to the recipient device;

sending, from the communication facilitator, a query to the sender device in accordance with the recipient template generated based on a stored availability or identified location of a receiving party using the recipient device;

receiving, at the communication facilitator, from the sender device, a sender response to the query from the sender device; and sending, at the communication facilitator, in accordance with the recipient template and based on the sender response to the query, the communication to the recipient device.

32. The method of claim 31 further comprising receiving one or more of the following template generation factor: recipient instructions, third party instructions or peripheral information;
and generating the recipient template based on the one or more template generation factor.

33. The method of claim 32 wherein the peripheral information includes one or more of the following: recipient's electronic calendar, time of day, date, or location information of the sender, recipient, third party, or object.

34. The method of claim 31 further comprising receiving input from the recipient device and/or a third party, at the communication facilitator, specifying one or more rules determining a mode of contact to the recipient device based on information collected from the sender or peripheral information; and generating the recipient template based on the received input.

35. The method of claim 31 wherein the one or more queries are provided in one or more of the following forms: binary choice, select one option from multiple choice, select multiple options from multiple choice, receive free-form text, values, images, or other information.

36. The method of claim 31 wherein the communication to the recipient device includes pre-disclosure information about the nature of the communication.

37. The method of claim 36 wherein the pre-disclosure information is provided based on the sender response to the query.

38. The method of claim 36 wherein the pre-disclosure information is provided based on peripheral information.

39. A communication facilitator comprising:
one or more communication interfaces capable of receiving, at the communication facilitator, information from a sender device and capable of sending information to a recipient device;
a memory storing recipient contact information and a recipient template, generated based on a stored availability or identified location of a receiving party using the recipient device and configured to dictate one or more queries to be provided to a sender device prior to sending a communication to the recipient device; and
a processor configured to permit information to be sent to the recipient device via the communication interface, based on the recipient contact information and recipient template stored in the memory.

40. The communication facilitator of claim 39 wherein the memory also stores sender pre-disclosure, and wherein the processor is configured to permit information to be sent to the recipient device also based on the sender pre-disclosure.

41. The communication facilitator of claim 40 wherein the sender pre-disclosure includes one or more responses received from the sender device in response to the one or more queries.

42. The communication facilitator of claim 39 wherein the one or more communication interfaces are capable of receiving one or more communication requests from the sender device without receiving the recipient contact information.

* * * * *